G. F. OUTTEN.
Car Brake.
No. 25,911. Patented Oct. 25, 1859.
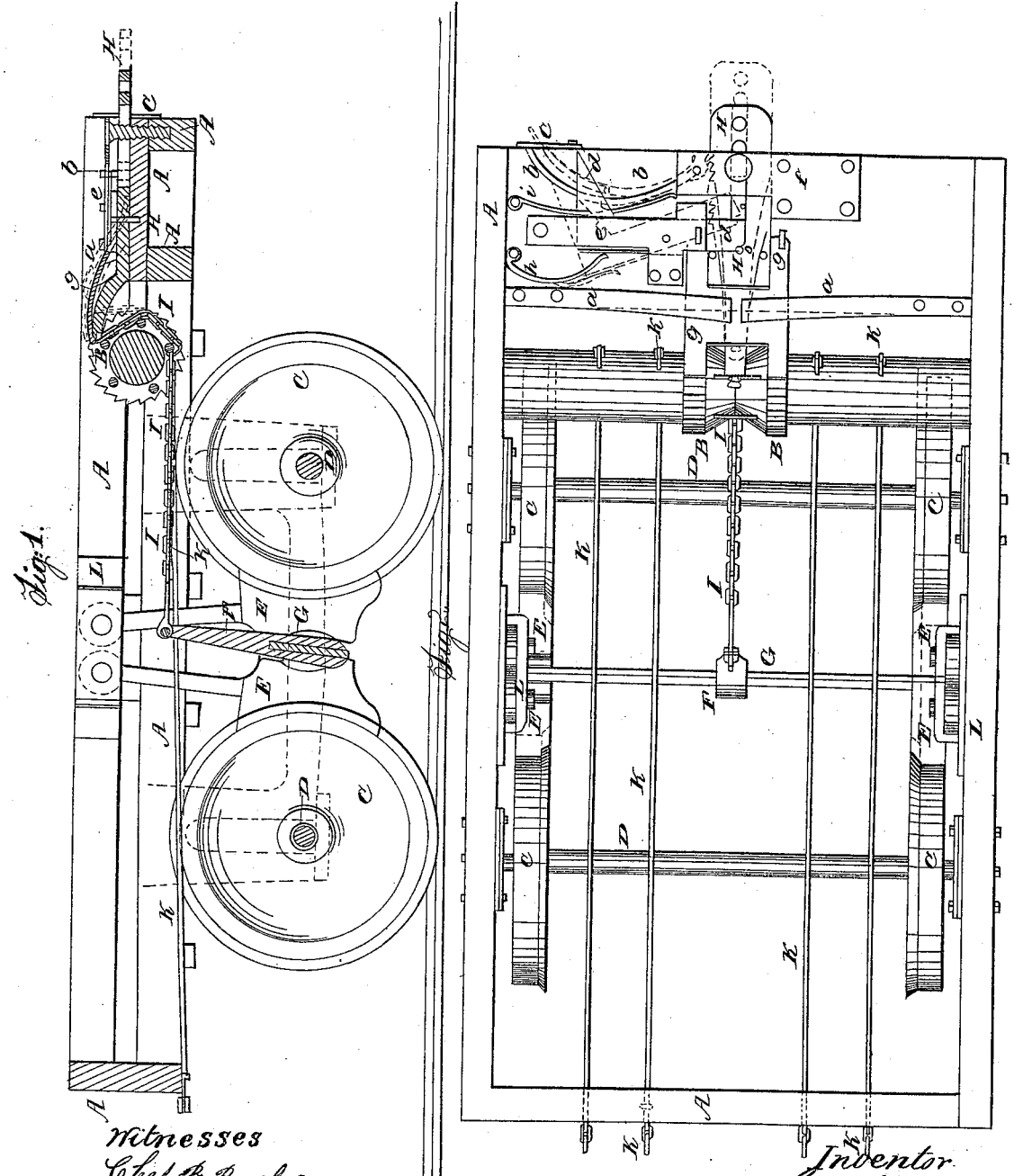

UNITED STATES PATENT OFFICE.

G. F. OUTTEN, OF NORFOLK, VIRGINIA.

CAR-BRAKE.

Specification of Letters Patent No. 25,911, dated October 25, 1859.

*To all whom it may concern:*

Be it known that I, GEORGE F. OUTTEN, of Norfolk city and county, in the State of Virginia, have invented new and useful Improvements in Car-Brakes; and I do hereby declare that the following is a full and exact description thereof, reference being had to the accompanying drawings and to the letters of reference marked thereon.

To enable others skilled in the art to make and use my invention I will proceed to describe its construction and operation.

Figure 1 is a longitudinal vertical section. Fig. 2 is a plan view.

This brake is self-adjustable and is rendered so either by pressure or pulling from the front, provided that the stop $c$ is thrown over the end of the spring lever $b$, which prevents the action of the combination of machinery belonging to said spring, upon the brake. The brake itself is simply a lever G with a long handle or continuation F; attached to the upper end of this is the chain I running over the irons placed between the ratchet wheels B, B, for that purpose; this chain I is then attached to the spring end of the slide plate H; by means of this slide plate direct motion is given to the brake lever G in the following manner:—The plate has near the outer end a bolt-hole so that it may readily be fastened to the car in advance; at a proper distance back of this bolt hole is a slot sufficient to allow a proper length of slide, working over a square bolt as shown; now when the locomotive or car in advance is stopped, immediate motion is given to this plate H by the actuating power, causing it to move either back or forward as the case may be; when the plate H slides in its place it is so curved at its rear end, that by pulling it forward it throws up the ratchet catch $g$, or when pushed back falls and catches in the teeth of ratchet wheels B, B, where it is held firmly by the springs $a$, $a$, and the weight acting upon the chains K, K, from behind; when in this position the brake is down as represented in the drawings. When the cars are ready to start again and a sufficient pull is given, it causes this plate to move forward (as shown in red lines) thus throwing the ratchet catch up and of course relieving the brake. Should the brakeman see proper to stop the brake from acting of itself he may do so by throwing down the stop $c$ from over the end of the spring lever $b$. The plate H, when sliding forward has teeth on one side into which the end of spring lever $b$ fits and prevents it from going back again until relieved by hand from the other end of said lever $b$. The spring lever is acted upon by means of the combination that follows:—The slide plate H has set in it a stud $o$ (with the end of it beveled like a door bolt) which when moved forward strikes the notched end of the spring catch $d$ causing the opposite end to be pressed back, allowing the stud caught against the spring lever $b$ to be thrown out of its holding slot in catch $d$. The stud $o$ on lever $b$ then having nothing to hold it allows said lever to fly forward (as shown in red-lines,) being caused to do so by the pressure of spring $i$ from behind the catch on the end of spring lever $b$ taking hold in the teeth of slide plate H, from which position it cannot be moved except by hand. Spring $h$ holds catch $d$ forward.

What I claim as new and desire to secure by Letters Patent is:

The combination and arrangement of slide H, pawl $g$, spring $a$, ratchet wheels B, and chain I, levers $d$, and $b$, and spring $h$ operating automatically or by hand as may be desired, as herein set forth and described.

G. F. OUTTEN.

Witnesses:
F. G. CLAYTON,
J. C. CLAYTON.